(12) United States Patent
Pearce et al.

(10) Patent No.: US 6,791,304 B2
(45) Date of Patent: Sep. 14, 2004

(54) ELECTRONIC DEVICE INCLUDING MULTIPHASE SWITCHING REGULATOR AND RELATED METHODS

(75) Inventors: Lawrence G. Pearce, Palm Bay, FL (US); Nicolaas W. Van Vonno, Melbourne, FL (US)

(73) Assignee: Intersil Americas Inc., Milpitas, CA (US)

( * ) Notice: Subject to any disclaimer, the term of this patent is extended or adjusted under 35 U.S.C. 154(b) by 38 days.

(21) Appl. No.: 10/350,755

(22) Filed: Jan. 24, 2003

(65) Prior Publication Data

US 2004/0145360 A1 Jul. 29, 2004

(51) Int. Cl.[7] .............................................. G05F 1/618
(52) U.S. Cl. ..................................... 323/283; 323/272
(58) Field of Search ................................. 323/222–225, 323/265, 266, 268, 271, 272, 282, 283, 284

(56) References Cited

U.S. PATENT DOCUMENTS

| | | | |
|---|---|---|---|
| 5,932,938 A | * | 8/1999 | Shimamori ................. 307/125 |
| 5,959,441 A | | 9/1999 | Brown ......................... 323/282 |
| 6,194,883 B1 | * | 2/2001 | Shimamori .................. 323/283 |
| 6,362,607 B1 | | 3/2002 | Wickersham et al. ........ 323/272 |
| 6,424,129 B1 | * | 7/2002 | Lethellier .................... 323/272 |
| 6,593,724 B1 | * | 7/2003 | Chen ........................... 323/283 |

* cited by examiner

Primary Examiner—Michael Sherry
Assistant Examiner—Gary L. Laxton
(74) Attorney, Agent, or Firm—Allen, Dyer, Doppelt, Milbrath & Gilchrist, P.A.

(57) ABSTRACT

An electronic device may include a circuit board, at least one load circuit carried by the circuit board, and a power distribution conductor carried by the circuit board and connected to the at least one load circuit. The electronic device may also include a multiphase switching regulator including a plurality of output stages connected to the power distribution conductor, and a controller for controlling the output stages based upon respective phase currents. The respective phase currents may be derived from corresponding voltage drops across the power distribution conductor and a matrix of resistivity values.

26 Claims, 4 Drawing Sheets

ELECTRONIC DEVICE INCLUDING MULTIPHASE SWITCHING REGULATOR AND RELATED METHODS

FIELD OF THE INVENTION

The present invention relates to the field of electronic devices, and, more particularly, to voltage regulators and related methods.

BACKGROUND OF THE INVENTION

Many electronic devices use voltage regulators to convert a base DC voltage to a particular operating voltage for a given component or components. Various types of voltage regulators are available, such as switching regulators, linear regulators, etc. Such voltage regulators can be boost regulators which, as the name implies, provide a higher output voltage than the base voltage, or buck regulators which provide a lower output voltage than the base DC voltage.

One voltage regulator which is commonly used with microprocessors is the multiphase switching buck converter. A multiphase DC-to-DC converter includes multiple output stages with inductors that are switched on and off in separate phases. As a result, the switching load is distributed over several phases which reduces switching transients compared with traditional switching regulators, plus smaller inductors may be used and fewer input capacitors may also be required. The multiphase architecture also reduces peak inductor currents, thereby enhancing efficiency.

One example of a multiphase DC voltage regulator is disclosed in U.S. Pat. No. 5,959,441 to Brown. In particular, this patent is directed to a multiphase direct current (DC) regulator which uses voltage mode control to provide a regulated voltage and provide current equalization between the phases. The regulator includes a voltage mode control circuit receiving an indication voltage level indicative of the amount of current supplied from the DC power source to an inductor of a first phase. The voltage mode control circuit provides a first control signal to a switching circuit based upon the indication voltage level, and the switching circuit provides a switching signal to a switch. The switch controls the amount of current from the DC power source that is supplied to a second inductor of a second phase based upon the switching signal. Another similar example of a multiphase DC voltage regulator is provided in U.S. Pat. No. 5,959,441 to Brown.

In such multiphase regulators, it is typically desired to monitor the various phase currents to perform such functions as fault detection, current balancing, etc. Such current monitoring is typically done by measuring the current present at the output of each output stage. Yet, unless the components of the output stages are carefully matched and calibrated, the component tolerances and/or temperature compensation responses of such components will adversely affect the precision with which these currents can be measured.

SUMMARY OF THE INVENTION

In view of the foregoing background, it is therefore an object of the present invention to provide a multiphase switching regulator and related methods which allow for relatively precise output phase current measurement.

This and other objects, features, and advantages in accordance with the present invention are provided by an electronic device which may include a circuit board, at least one load circuit carried by the circuit board, and a power distribution conductor carried by the circuit board and connected to the at least one load circuit. The electronic device may also include a multiphase switching regulator including a plurality of output stages connected to the power distribution conductor, and a controller for controlling the output stages based upon respective phase currents. The respective phase currents may be derived from corresponding voltage drops across the power distribution conductor and a matrix of resistivity values.

More particularly, the electronic device may also include at least one analog-to-digital converter for converting the corresponding voltage drops to digital values, and the matrix of resistivity values may be a matrix of digital resistivity values. Thus, the controller may include digital processing circuitry for deriving the respective phase currents based upon these digital values. The controller may also include a memory for storing the matrix of digital resistivity values.

As such, the multiphase switching regulator may advantageously utilize digital processing to determine the phase currents, while reducing the potential inaccuracies associated with prior art current monitoring approaches. That is, because the controller determines the phase currents based upon the respective voltage drops across the power distribution conductor, the effects of varying component tolerances can be significantly reduced. Thus, specially matched or calibrated components, such as the FETs used in the output stages, need not be used in many applications. Accordingly, precise current derivation may be obtained while leaving more error budget in the circuit design for items such as load-line indeterminacy, for example.

Further still, the electronic device may also include a resistivity measurement structure connected to the power distribution conductor and the controller. As such, the controller may generate the matrix of resistivity values based upon baseline resistivity values and resistivity values from the resistivity measurement structure. For example, the baseline resistivity values could be measured and stored during manufacture, and measurements taken from the resistivity measurement structure may be taken during operation and used to adjust the baseline values based upon resistivity fluctuations caused by temperature, aging, etc. By way of example, the resistivity measurement structure may be at least one Van der Pauw measurement structure.

Moreover, the multiphase switching regulator may be a pulse width modulated switching regulator. The multiphase switching regulator may also be a multiphase buck switching regulator, for example. Further, each output stage may include at least one output and an inductor connected thereto, and the matrix of resistivity values may be based upon resistivities from the inductors to the at least one load circuit (i.e., the resistivities of the power distribution conductor).

Additionally, the circuit board may include at least one dielectric layer and at least one conductive layer thereon, and the at least one load circuit may be a microprocessor, for example. The electronic device may also include a battery connected to the multiphase switching regulator.

A method aspect of the invention is for supplying power to at least one load circuit carried by a circuit board using a power distribution conductor also carried by the circuit board and connected to the at least one load circuit. The method may include connecting a plurality of output stages to the power distribution conductor, and determining respective voltage drops across the power distribution conductor for the output stages. Moreover, phase currents may be derived for the output stages based upon the voltage drops and a matrix of resistivity values, and the output stages may be controlled to provide multiphase switching based upon the derived phase currents.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
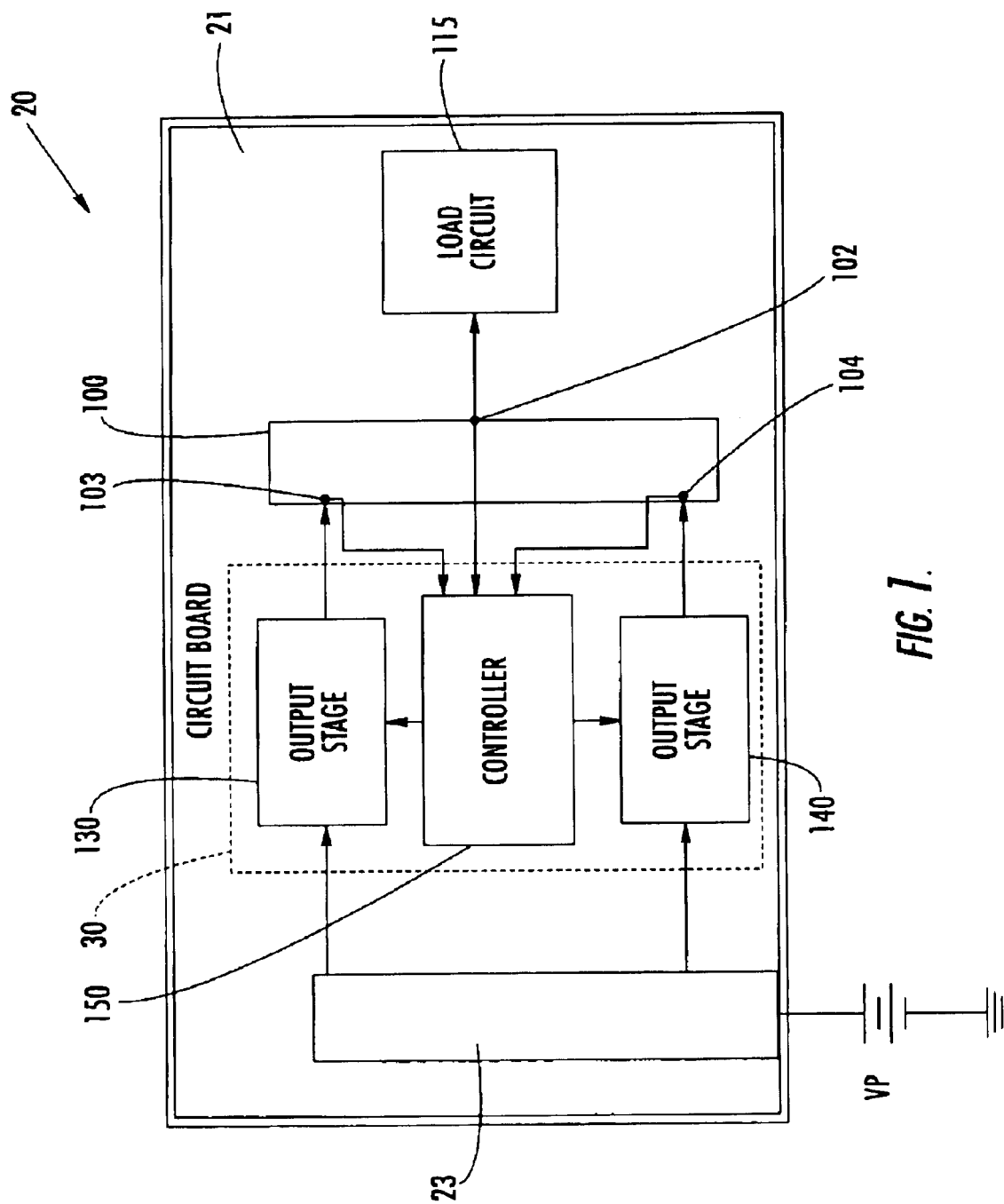
FIG. 1 is schematic block diagram of an electronic device including a multiphase switching regulator in accordance with the present invention.
Figure 2:
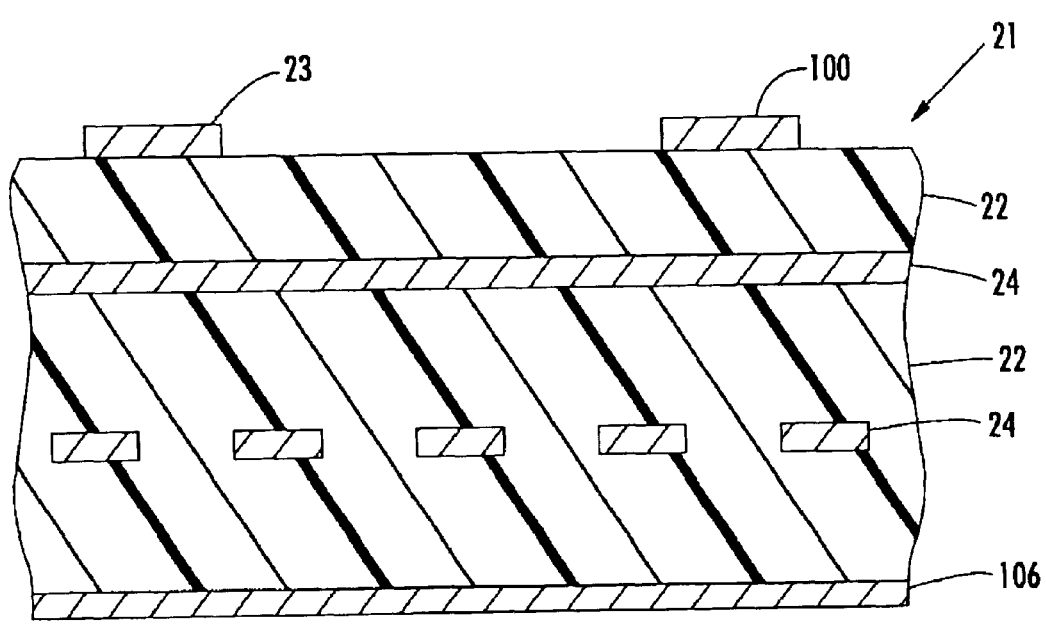
FIG. 2 is a cross-sectional view of a portion of the circuit board of the electronic device of FIG. 1.

Referring initially to FIGS. 1 and 2, an electronic device 20 illustratively includes a circuit board 21 and one or more load circuits 115 carried by the circuit board. By way of example, the electronic device 20 could be a computer or other device which requires one or more regulated voltages. Further, numerous types of load circuits 115 may be used, such as microprocessors or other components, as will be appreciated by those skilled in the art. The circuit board 21 illustratively includes one or more dielectric layers 22 and conductive layers 23, 100 thereon. In particular, the conductive layer 23 provides an electrical connection from the circuit board 21 to a power source VP, such as a battery or other suitable DC power supply, for example. Also, the conductive layer 100 serves as a power distribution conductor for providing a regulated voltage to the load circuit 115, as will be explained further below.

The circuit board 21 also illustratively includes conductive layers 24 therein which may be used for routing signals between the various circuits on the circuit board, for example. A conductive layer 106 may be on the opposite side of the circuit board 21 from the conductive layers 23, 100 and provide a signal or power ground, etc. Of course, those of skill in the art will appreciate that the circuit board configuration illustratively shown in FIG. 2 is merely exemplary, and that numerous circuit boards and conductive layer/signal routing configurations may he used in accordance with the present invention.

To provide the regulated voltage to the load circuit 115, the electronic device 20 also illustratively includes a multiphase switching regulator 30. In the illustrated example, the multiphase switching regulator 30 includes two output stages 130, 140 which thus define a two-phase regulator. Of course, other numbers of output stages may also be used in other embodiments, as will be appreciated by those skilled in the art. The output stages 130, 140 are connected between the conductive layer 23, which provides the DC voltage VP. thereto, and the power distribution conductor 100. Moreover, the multiphase switching regulator 30 also includes a controller 150 for controlling the output stages 130, 140 based upon their respective output phase currents.

In accordance with the present invention, the controller 150 derives the phase currents from the output stages 130, 140 based upon corresponding voltage drops across the power distribution conductor 100 and a matrix of resistivity values also corresponding to the power distribution conductor. That is, the voltage drops are measured between the respective nodes 103, 104 (where the output stages 130, 140 connect to the power distribution conductor 100) and the node 102 where the load circuit 115 is connected to the power distribution conductor. The matrix resistivity values are similarly derived from resistivities measured between the nodes 102–104, as will be explained further below.

It will thus be appreciated by those of skill in the art that the present invention provides for a relatively precise derivation of the respective phase currents for the output stages 130, 140 while reducing the potential inaccuracies associated with prior art current monitoring approaches. That is, in prior art devices the tolerances of the field effect transistors (FETs) used to provide the switching in the output stages can vary widely, which in turn diminishes the precision with which the currents can be measured, as will be appreciated by those of skill in the art. Yet, because the controller 150 determines the phase currents based upon the respective voltage drops across the power distribution conductor 100, varying tolerances of the components within the output stages 130, 140 will have relatively little effect on the current derivation.

Figure 3:
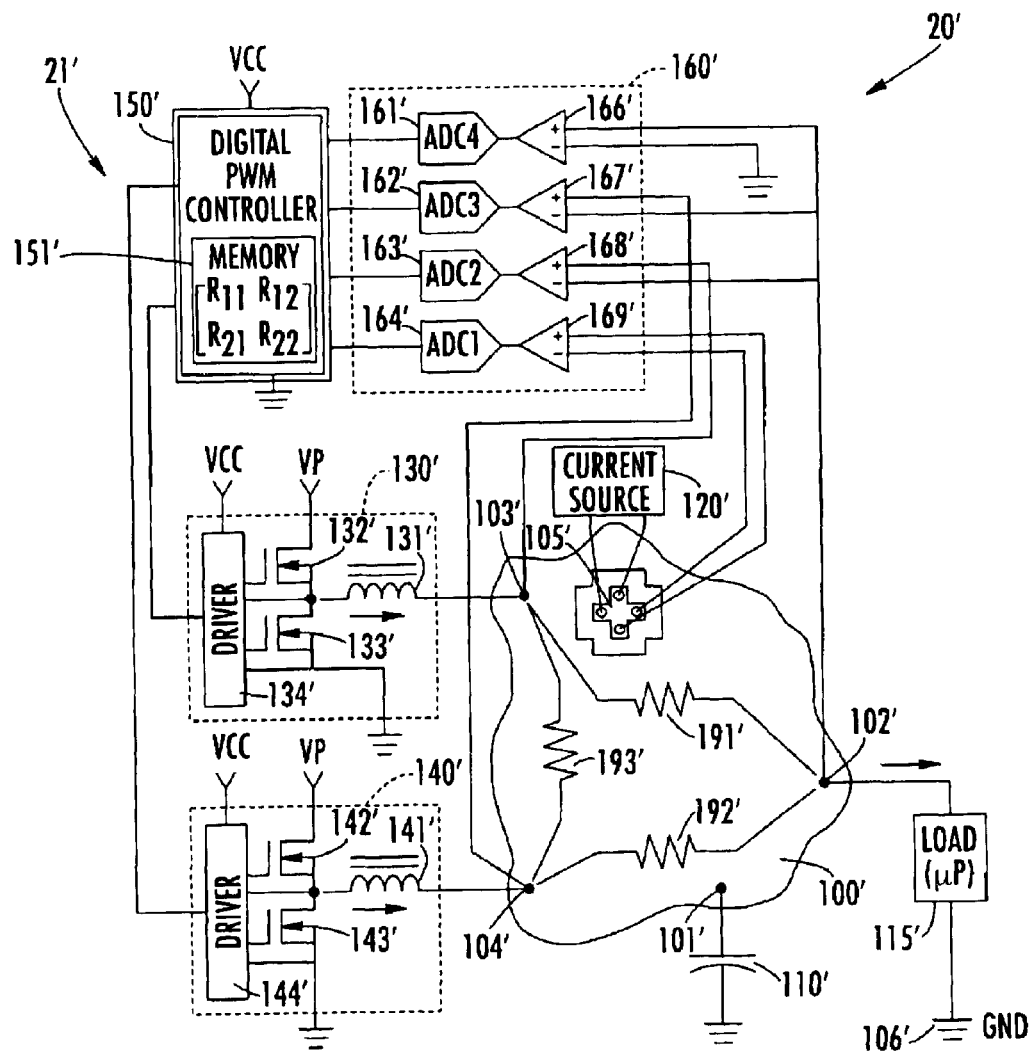
FIG. 3 is a schematic block diagram of an alternate embodiment of the electronic device of FIG. 1 in which the multiphase switching regulator implements digital phase current derivation and temperature compensation.

The foregoing will be further understood with reference to the alternate embodiment of the electronic device 20' illustrated in FIG. 3. Here, the power distribution conductor 100' is shown without an accompanying dielectric layer for clarity of illustration. Further, the power distribution conductor 100' is shown as being of an arbitrary shape to illustrate that the present invention is applicable to numerous geometries of power distribution conductors, even multi-level conductors, as will be appreciated by those skilled in the art.

In the illustrated embodiment, the multiphase switching regulator 20' is a two-phase, synchronous buck regulator. Of course, those of skill in the art will appreciate that the present invention is equally applicable to boost regulators as well buck regulators. Power is supplied to the power distribution conductor 100' by way of the output stages 130', 140', as noted above. The output stages 130', 140' may be standard- synchronous buck DC-DC switching converters which illustratively include respective drivers 134', 144', half-bridge FET stages each including N-channel FETS 132', 133' and 142', 143', and output inductors 131', 141'. Operation of these standard output stages 130', 140' in a multiphase buck regulator configuration will be understood by those of skill in the art and will therefore not be discussed further herein. The output stages 130', 140' and the controller 150' will typically operate based upon system voltages VCC and VP, as illustratively shown.

Moreover, the controller 150' is illustratively shown as a digitally controlled, pulse width modulated controller which thus provides pulse width modulated switching of the outputs of the output stages 130', 140'. Even so, pulse width modulation need not be used in every embodiment, and other suitable control techniques known to those skilled in the art may also be used. The controller 150' thus includes digital processing circuitry for digitally performing the numerical derivation of the two phase currents from the output stages 130', 140'. Again, this derivation is based upon the voltage drops across the power distribution conductor 100' and a matrix of digital resistivity values corresponding to the power distribution conductor.

More particularly, in an analog-to-digital (A/D) conversion stage 160' the respective differential voltages between each of the nodes 102'–104' are respectively measured by amplifiers 167'–169'. The outputs of the amplifiers 167'–169' are converted to digital values by analog-to-digital (A/D) converters 162'–164', respectively. The output voltage between the node 102' and ground 106' may also be measured and converted via the amplifier 166' and A/D converter 161' in some embodiments to allow a voltage based control loop to be realized, as will be appreciated by those skilled in the art.

With respect to the matrix of resistivity values, the present invention takes advantage of the fact that the electrical connections to the power distribution conductor 100' at the nodes 102'–104' will unavoidably impart some undesirable resistance between these nodes. It should be noted that in some embodiments these nodes 102'–104' may actually be multiple nodes or even distributed connections, but for clarity of illustration and explanation they are considered to be single point connections herein.

For a fixed physical configuration of materials substantially obeying Ohm's law, such as in a printed circuit board (PCB) conductor layout, the direct current behavior of the power distribution conductor 100' with respect to the load circuit connection node 102' and the input nodes 103', 104' (which are connected to the outputs of the inductors 131', 141') can be represented by the illustrated resistances 191', 192', and 193' between these nodes. That is, the matrix of resistivity values used for deriving the phase currents is determined using the resistances 191'–193'.

More particularly, the behavior of the power distribution conductor 100' (which again may be arbitrarily shaped) can be generalized through linear network theory to matrix relations. That is, the relation between the phase currents entering at nodes 103' and 104' (i.e., $I_{103}$ and $I_{104}$) and the voltages at the nodes 102', 103', and 104' (i.e., $V_{102}$, $V_{103}$, $V_{104}$) is given as $$\begin{bmatrix} (V_{103} - V_{102}) \\ (V_{104} - V_{102}) \end{bmatrix} = \begin{bmatrix} R_{11} & R_{12} \\ R_{21} & R_{22} \end{bmatrix} \begin{bmatrix} I_{103} \\ I_{104} \end{bmatrix}. \quad (1)$$

The resistor matrix elements, $R_{ij}$, are related to the resistances 191'–193' as follows:

$$R_{11}=R_{191}(R_{192}+R_{193})/(R_{191}+R_{192}+R_{193}); \quad (2)$$

$$R_{12}=R_{21}=R_{191}R_{192}/(R_{191}+R_{192}+R_{193}); \text{ and} \quad (3)$$

$$R_{22}=R_{192}(R_{191}+R_{193})/(R_{191}+R_{192}+R_{193}). \quad (4)$$

The resistances 191'–193' can be relatively easily determined during manufacture or setup, for example, by measuring the differential voltages with known currents $I_{103}$ and $I_{104}$. One approach is to alternately set one of the currents to zero and measure the resistances 191'–193' directly. By way of example, both NMOS FETs 132' and 133' may be set to an "off" or non-conductive state, and the supply current into node 103' held to zero while the resulting resistance 192' from the node 104' to the node 102' is measured, etc. The controller illustratively includes a memory 151' for storing the matrix of digital values one established.

The above matrix relationship (1) can be solved for the phase currents as follows:

$$\begin{bmatrix} I_{103} \\ I_{104} \end{bmatrix} = \begin{bmatrix} G_{11} & G_{12} \\ G_{21} & G_{22} \end{bmatrix} \begin{bmatrix} (V_{103} - V_{102}) \\ (V_{104} - V_{102}) \end{bmatrix}. \quad (5)$$

Here, the conductance matrix elements, $G_{ij}$, are related to the resistances 191'–193' as follows:

$$G_{11}=(1/R_{191})+(1/R_{193}); \quad (6)$$

$$G_{12}=G_{21}=-(1/R_{193}); \text{ and} \quad (7)$$

$$G_{22}=(1/R_{192})+(1/R_{193}). \quad (8)$$

In many embodiments, the matrix relationship (5) may be more readily solved to find the respective currents from the measured voltages. However, directly extracting the conductance matrix elements $G_{ij}$ may be more difficult in that it may be harder to force the differential voltages to zero (i.e., impose a zero resistance element) than it is to force currents to zero, as in the resistance matrix relationship above. Yet, since the resistivity and conductivity matrices are simply the inverse of one another (i.e., $G=R^{-1}$), only one of the matrices need be determined by measurement since the other can be directly calculated, as will be appreciated by those of skill in the art. Accordingly, it will be understood by those skilled in the art that the use of the term "resistivity" herein is meant to apply to embodiments where either resistivity or conductivity values are used, as one is simply the inverse of the other.

It should be noted that the resistive behavior of the power distribution conductor 100' is of course dependent on its physical geometry. For a PCB implementation, the power distribution conductor 100' is determined by a two-dimensional layout that is reproduced with a high degree of accuracy on each circuit board. To this extent, the two-dimensional layout of the power distribution conductor 100' will typically vary little from one board to the next.

Nonetheless, the third dimension of the power distribution conductor 100', i.e., its thickness, is typically less tightly controlled and may vary significantly from board to board. This factor provides a proportionality factor to the matrix. For example, the actual conductance matrix may be given as:

$$G=\sigma G_0, \quad (9)$$

where the two-dimensional design information is included in the $G_0$ matrix and the thickness, or sheet conductance, information is included in the proportionality factor $\sigma$. As such, the extent and precision to which the resistance/conductance values will need to be measured in a given application will depend primarily upon the expected variations in conductive layer thickness and the desired accuracy of the phase current derivation, for example.

It will therefore be appreciated that the derivation of the phase currents $I_{103}$, $I_{104}$ is substantially independent of the FETs 132', 133', and 142', 143'. As such, less expensive FETs with lower tolerances may potentially be used in some applications, and no particular matching or calibration of such components need be performed in many applications. That is, the multiphase switching regulator 30' of the present invention provides relatively precise current derivation while leaving more error budget in the circuit design for other items such as load-line indeterminacy, for example, as will be appreciated by those of skill in the art.

In accordance with another advantageous aspect of the invention, the electronic device 20' further illustratively includes-a resistivity measurement structure 105', such as a four-terminal Van der Pauw structure, connected to the controller 150' via the A/D conversion stage 160' which advantageously allows for calibration with respect the sheet conductance of the power distribution conductor. The measurement structure 105' may be constructed out of the same PBC conductor that the power distribution conductor 100' is made from and include an accompanying current source 120', as will be appreciated by those skilled in the art. Yet, the measurement structure 105' need not be a part of the power distribution conductor 100'.

In particular, the measurement structure 105' allows calibration of the resistance/conductance matrix on a board-to-board basis. In addition, it can allow calibration to track changes with temperature or other lifetime fluctuations. If the real-time tracking is not needed, the measurement structure 105' might be used for a one-time calibration of the board, and this information permanently stored in the memory 151'.

By way of example, a matrix of baseline resistivity values may be established as described above under predetermined conditions (e.g., at room temperature) for a particular circuit board design or prototype board. For each circuit board manufactured, the Van der Pauw measurement may then be used to simply adjust the baseline values appropriately for the given board, rather than measuring the resistances 191'-193' for each board of course, the adjusted baseline values could be stored directly to the memory 151', or the initial baseline values and the Van der Pauw proportionality factor could be stored in the memory and the controller 150' could perform the calibration.

For real-time calibration, the baseline values would be stored in the memory 151' and the controller 150' would update these values based upon the successive measurements provided by the measurement structure 105'. Accordingly, resistivity fluctuations resulting from temperature changes, aging, etc., may advantageously be accounted for to provide still further precision in the derivation of the phase currents $I_{103}$, $I_{104}$, if desired in a given application.

It should be noted that the exemplary embodiments illustrated in FIGS. 1 and 2 are provided by way of example only, and that numerous other configurations and implementations are possible. By way of example, the A/Ds 161'-164' could be implemented in a single A/D that is multiplexed between the various signals. Furthermore, it should be noted that in some embodiments the matrix of resistivity values could correspond to the ground conductor 106', or to both the ground conductor and the power distribution conductor 100', as will be appreciated by those skilled in the art.

Figure 4:
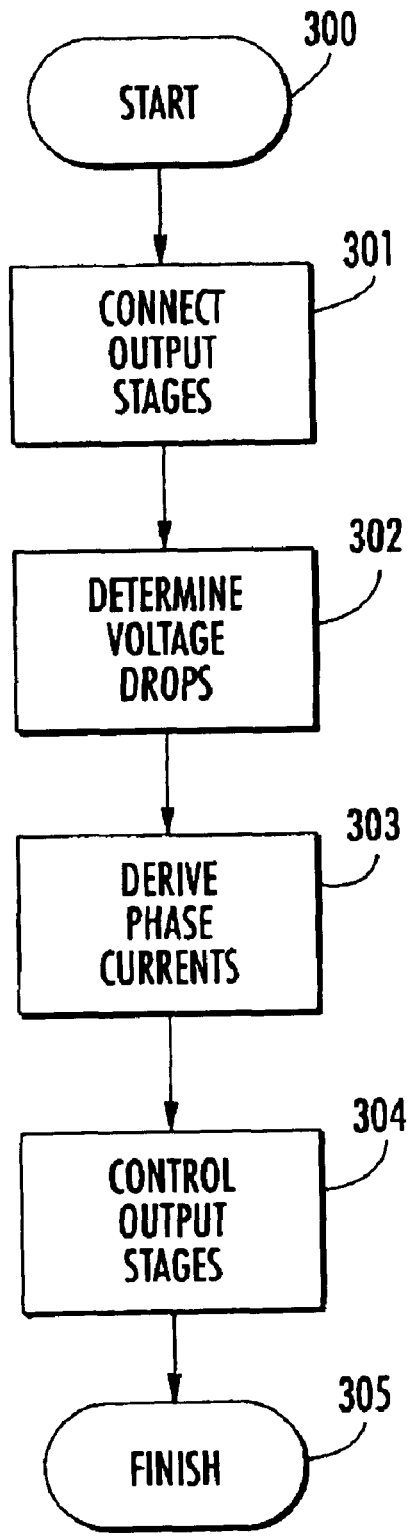
FIG. 4 is flow diagram illustrating a method in accordance with the present invention.

Turning now to FIG. 4, a method aspect of the invention is for supplying power to at least one load circuit 115 carried by a circuit board 21 using a power distribution conductor 100 also carried by the circuit board and connected to the load circuit(s). The method begins (Block 300) by connecting a plurality of output stages 103, 104 to the power distribution conductor 100, at Block 301, and determining respective voltage drops (i.e., $V_{103}-V_{102}$, $V_{104}-V_{102}$) across the power distribution conductor for the output stages, at Block 302.

Moreover, the phase currents may be derived for the output stages (Block 303) based upon the voltage drops and a matrix of resistivity values, and the output stages may be controlled to provide multiphase switching based upon the derived phase currents, at Block 304, as previously described above. The steps illustrated with respect to Blocks 302–304 would be repeated in an actual implementation, but the method is illustratively shown as terminating at Block 305 for clarity of illustration. Additional method aspects of the invention will be readily apparent to those of skill in the art based upon the forgoing description and will therefore not be discussed further herein to avoid undue repetition.

Many other modifications and other embodiments of the invention will come to the mind of one skilled in the art having the benefit of the teachings presented in the forgoing descriptions and the associated drawings. Therefore, it is understood that the invention is not to be limited to the specific embodiments disclosed, and that modifications and embodiments are intended to be included within the scope of the appended claims.

That which is claimed is:

1. An electronic device comprising:

a circuit board;

at least one load circuit carried by said circuit board;

a power distribution conductor carried by said circuit board and connected to said at least one load circuit; and a multiphase switching regulator comprising
a plurality of output stages connected to said power distribution conductor, and
a controller for controlling said output stages based upon respective phase currents derived from corresponding voltage drops across said power distribution conductor and a matrix of resistivity values.

2. The electronic device of claim 1 further comprising at least one analog-to-digital converter for converting the corresponding voltage drops to digital voltage values; wherein the matrix of resistivity values comprises a matrix of digital resistivity values; and wherein said controller comprises digital processing circuitry.

3. The electronic device of claim 2 wherein said controller further comprises a memory storing the matrix of digital resistivity values.

4. The electronic device of claim 1 wherein said multiphase switching regulator comprises a pulse width modulated switching regulator.

5. The electronic device of claim 1 further comprising a resistivity measurement structure connected to said controller and having a resistivity corresponding to that of said power distribution conductor; and wherein said controller generates the matrix of resistivity values based upon baseline resistivity values and resistivity values from said resistivity measurement structure.

6. The electronic device of claim 5 wherein said resistivity measurement structure comprises at least one Van der Pauw measurement structure.

7. The electronic device of claim 1 wherein each output stage comprises at least one output and an inductor connected thereto; and wherein the matrix of resistivity values is based upon resistivities from the inductors to said at least one load circuit.

8. The electronic device of claim 1 wherein said multiphase switching regulator comprises a multiphase buck switching regulator.

9. The electronic device of claim 1 wherein said circuit board comprises at least one dielectric layer and at least one conductive layer thereon.

10. The electronic device of claim 1 wherein said at least one load circuit comprises a microprocessor.

11. The electronic device of claim 1 further comprising a battery connected to said multiphase switching regulator.

12. An electronic device comprising:

a circuit board;

at least one load circuit carried by said circuit board;

a power distribution conductor carried by said circuit board and connected to said at least one load circuit;

a pulse width modulated multiphase switching regulator comprising
    a plurality of output stages connected to said power distribution conductor, and
    a controller for controlling said output stages based upon respective phase currents, said controller comprising digital processing circuitry for deriving the respective phase currents from digital voltage values representing corresponding voltage drops across said power distribution conductor and a matrix of digital resistivity values; and at least one analog-to-digital converter connected between said power distribution conductor and said controller for converting the corresponding voltage drops to the digital voltage values.

13. The electronic device of claim 12 wherein said controller further comprises a memory storing the matrix of digital resistivity values.

14. The electronic device of claim 12 further comprising a resistivity measurement structure connected to said controller and having a resistivity corresponding to that of said power distribution conductor; and wherein said controller generates the matrix of digital resistivity values based upon baseline resistivity values and resistivity values from said resistivity measurement structure.

15. The electronic device of claim 14 wherein said resistivity measurement structure comprises at least one Van der Pauw measurement structure.

16. The electronic device of claim 12 wherein each output stage comprises at least one output and an inductor connected thereto; and wherein the matrix of digital resistivity values is based upon resistivities from the inductors to said at least one load circuit.

17. The electronic device of claim 12 wherein said multiphase switching regulator comprises a multiphase buck switching regulator.

18. The electronic device of claim 12 wherein said circuit board comprises at least one dielectric layer and at least one conductive layer thereon.

19. The electronic device of claim 12 wherein said at least one load circuit comprises a microprocessor.

20. The electronic device of claim 12 further comprising a battery connected to said multiphase switching regulator.

21. A method for supplying power to at least one load circuit carried by a circuit board using a power distribution conductor also carried by the circuit board and connected to the at least one load circuit, the method comprising:

connecting a plurality of output stages to the power distribution conductor;

determining respective voltage drops across the power distribution conductor for the output stages;

deriving phase currents for the output stages based upon the voltage drops and a matrix of resistivity values; and controlling the output stages to provide multiphase switching based upon the derived phase currents.

22. The method of claim 21 further comprising converting the voltage drops to digital voltage values; wherein the matrix of resistivity values comprises a matrix of digital resistivity values; and wherein deriving the phase current comprises deriving the phase currents using digital processing.

23. The method of claim 21 wherein controlling comprises controlling the output stages to provide pulse width modulated multiphase switching.

24. The method of claim 21 further comprising:

measuring resistivity values of the power distribution conductor; and generating the matrix of resistivity values based upon baseline resistivity values and the measured resistivity values.

25. The method of claim 24 wherein measuring comprises measuring the resistivity values using at least one Van der Pauw measurement structure.

26. The method of claim 21 wherein each output stage comprises at least one output and an inductor connected thereto; and wherein the matrix of resistivity values is based upon resistivities from the inductors to the at least one load circuit.

* * * * *